US012238362B2

(12) United States Patent
Tian et al.

(10) Patent No.: US 12,238,362 B2
(45) Date of Patent: Feb. 25, 2025

(54) CONSISTENCE OF ACOUSTIC AND VISUAL SCENES

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 79 days.

(21) Appl. No.: 17/945,024

(22) Filed: Sep. 14, 2022

(65) Prior Publication Data

US 2023/0098577 A1 Mar. 30, 2023

Related U.S. Application Data

(60) Provisional application No. 63/248,942, filed on Sep. 27, 2021.

(51) Int. Cl.
*H04N 21/43* (2011.01)
*G06T 7/40* (2017.01)
(Continued)

(52) U.S. Cl.
CPC .......... *H04N 21/4302* (2013.01); *G06T 7/40* (2013.01); *G06T 7/50* (2017.01); *G06T 7/60* (2013.01);
(Continued)

(58) Field of Classification Search
CPC ......... H04N 21/4302; H04N 21/44012; H04N 21/816; G06T 7/40; G06T 7/50;
(Continued)

(56) References Cited

U.S. PATENT DOCUMENTS

2017/0324931 A1\* 11/2017 Sun .......................... H04N 7/15
2018/0192222 A1 7/2018 De Bruijn et al.
2020/0008004 A1 1/2020 Eronen et al.

FOREIGN PATENT DOCUMENTS

EP 2352290 A1 \* 8/2011 ............... H04N 7/15
WO 2017205637 A1 11/2017

OTHER PUBLICATIONS

Method and Apparatus for Matching Audio and Video Signals during a videoconference by Van Kommer (EP 2352290A1). (Year: 2011).\*

(Continued)

*Primary Examiner* — Yogesh K Aggarwal
(74) *Attorney, Agent, or Firm* — ArentFox Schiff LLP

(57) ABSTRACT

Media content data of an object is received. Whether a first parameter indicated by a first description of the object in an acoustic scene and a second parameter indicated by a second description of the object in a visual scene are inconsistent is determined. Based on the first parameter indicated by the first description of the object in the acoustic scene and the second parameter indicated by the second description of the object in the visual scene being inconsistent, one of the first description of the object in the acoustic scene and the second description of the object in the visual scene is modified based on another one of the first description and the second description that is not modified, wherein the modified one of the first description and the second description is consistent with the other one of the first description and the second description that is not modified.

20 Claims, 7 Drawing Sheets

(51) Int. Cl.
  *G06T 7/50*  (2017.01)
  *G06T 7/60*  (2017.01)
  *G06T 7/70*  (2017.01)
  *H04S 7/00*  (2006.01)
  *G10L 19/008*  (2013.01)

(52) U.S. Cl.
  CPC ............... *G06T 7/70* (2017.01); *H04S 7/303* (2013.01); *G06T 2207/10016* (2013.01); *G10L 19/008* (2013.01); *H04S 2400/11* (2013.01)

(58) Field of Classification Search
  CPC .......................... G06T 7/60; G06T 7/70; G06T 2207/10016; H04S 7/303; H04S 2400/11; H04S 7/304; G10L 19/008; A63F 13/54; H04R 2499/15
  See application file for complete search history.

(56) References Cited

OTHER PUBLICATIONS

MPEG-I Immersive Audio Encoder Input Format, International Organization for Standardization Organisation Internationale De Normalisation ISO/IEC JTC1/SC29/WG6, MPEG Audio Coding, N0054, Apr. 2021, Virtual, Apr. 30, 2021, pp. 1-36.

MPEG-I Immersive Audio Documentation for the Audio Evaluation Platform, Version 1, International Organization for Standardization Organisation Internationale De Normalisation ISO/IEC JTC1/SC29/WG6, MPEG Audio Coding, No. 086, Jul. 2021, Virtual, Jul. 16, 2021, pp. 1-53.

International Search Report and Written Opinion issued in International Application No. PCT/US2022/076555, mailed Nov. 29, 2022, 9 pages.

* cited by examiner

CONSISTENCE OF ACOUSTIC AND VISUAL SCENES

INCORPORATION BY REFERENCE

The present application claims the benefit of priority to U.S. Provisional Application No. 63/248,942, "Consistence of Acoustic and Visual Scenes" filed on Sep. 27, 2021, which is incorporated by reference herein in its entirety.

TECHNICAL FIELD

The present disclosure describes embodiments generally related to media processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of immersive media, such as a virtual reality (VR) or an augmented reality (AR), visual information in a virtual scene and acoustic information in an acoustic scene can be provided to create or imitate a physical world through digital simulation, where perception is created by surrounding a user with images, videos, sounds or other stimuli that provide an engrossing total environment. The immersive media can create an environment which allows the user to interact with contents of the environment.

SUMMARY

Aspects of the disclosure provide methods and apparatuses for media processing. In some examples, an apparatus for media processing includes processing circuitry.

According to an aspect of the disclosure, a method of media processing at a media processing device is provided. In the method, media content data of an object can be received. The media content data can include a first description of the object in an acoustic scene that is generated by an audio engine and a second description of the object in a visual scene that is generated by a visual engine. Whether a first parameter indicated by the first description of the object in the acoustic scene and a second parameter indicated by the second description of the object in the visual scene are inconsistent can be determined. In response to the first parameter indicated by the first description of the object in the acoustic scene and the second parameter indicated by the second description of the object in the visual scene being inconsistent, one of the first description of the object in the acoustic scene and the second description of the object in the visual scene can be modified based on another one of the first description and the second description that is not modified. The modified one of the first description and the second description can be consistent with the other one of the first description and the second description that is not modified. The media content data of the object can be provided to a receiver that renders the media content data of the object for a media application.

In some embodiments, the first parameter and the second parameter can be both associated with one of an object size, an object shape, an object location, an object orientation, and an object texture of the object.

The one of the first description of the object in the acoustic scene and the second description of the object in the visual scene can be modified based on the other one of the first description of the object in the acoustic scene and the second description of the object in the visual scene. Accordingly, the first parameter indicated by the first description of the object in the acoustic scene can be consistent with the second parameter indicated by the second description of the object in the visual scene.

In the method, a third description of the object in a unified scene can be determined based on at least one of the first description of the object in the acoustic scene or the second description of the object in the visual scene. In response to the first parameter indicated by the first description of the object in the acoustic scene being different from a third parameter indicated by the third description of the object in the unified scene, the first parameter indicated by the first description of the object in the acoustic scene can be modified based on the third parameter indicated by the third description of the object in the unified scene. In response to the second parameter indicated by the second description of the object in the visual scene being different from the third parameter indicated by the third description of the object in the unified scene, the second parameter indicated by the second description of the object in the visual scene can be modified based on the third parameter indicated by the third description of the object in the unified scene.

In an example, an object size in the third description of the object in the unified scene can be determined based on an object size in the first description of the object in the acoustic scene. The object size in the third description of the object in the unified scene can be determined based on an object size in the second description of the object in the visual scene. The object size in the third description of the object in the unified scene can be determined based on an intersection size of an intersection between the object in the first description of the object in the acoustic scene and the object in the second description of the object in the visual scene. The object size in the third description of the object in the unified scene can be determined based on a size difference between the object size in the first description of the object in the acoustic scene and the object size in the second description of the object in the visual scene.

In an example, an object shape in the third description of the object in the unified scene can be determined based on an object shape in the first description of the object in the acoustic scene. The object shape in the third description of the object in the unified scene can be determined based on an object shape in the second description of the object in the visual scene. The object shape in the third description of the object in the unified scene can be determined based on an intersection shape of an intersection between the object in the first description of the object in the acoustic scene and the object in the second description of the object in the visual scene. The object shape in the third description of the object in the unified scene can be determined based on a shape difference between the object shape in the first description of the object in the acoustic scene and the object shape in the second description of the object in the visual scene.

In an example, an object location in the third description of the object in the unified scene can be determined based on an object location in the first description of the object in the acoustic scene. The object location in the third description of the object in the unified scene can be determined based on an object location in the second description of the object in the visual scene. The object location in the third description of the object in the unified scene can be determined based on a location difference between the object location in the first description of the object in the acoustic scene and the object location in the second description of the object in the visual scene.

In an example, an object orientation in the third description of the object in the unified scene can be determined based on an object orientation in the first description of the object in the acoustic scene. The object orientation in the third description of the object in the unified scene can be determined based on an object orientation in the second description of the object in the visual scene. The object orientation in the third description of the object in the unified scene can be determined based on an orientation difference between the object orientation in the first description of the object in the acoustic scene and the object orientation in the second description of the object in the visual scene.

In an example, an object texture in the third description of the object in the unified scene can be determined based on an object texture in the first description of the object in the acoustic scene. The object texture in the third description of the object in the unified scene can be determined based on an object texture in the second description of the object in the visual scene. The object texture in the third description of the object in the unified scene can be determined based on a texture difference between the object texture in the first description of the object in the acoustic scene and the object texture in the second description of the object in the visual scene.

In some embodiments, a description of the object in an anchor scene of the media content data can be determined based on one of the first description of the object in the acoustic scene and the second description of the object in the visual scene. In response to the description of the object in the anchor scene being determined based on the first description of the object in the acoustic scene, the second description of the object in the visual scene can be modified based on the first description of the object in the acoustic scene. In response to the description of the object in the anchor scene being determined based on the second description of the object in the visual scene, the first description of the object in the acoustic scene can be modified based on the second description of the object in the visual scene. Further, signaling information can be generated to indicate which one of the first description of the object in the acoustic scene and the second description of the object in the visual scene is selected to determine the description of the anchor scene.

In some embodiment, signaling information can be generated to indicate which one of the first parameter in the first description of the object in the acoustic scene and the second parameter in the second description of the object in the visual scene is selected to determine the third parameter in the third description of the object in the unified scene.

According to another aspect of the disclosure, an apparatus is provided. The apparatus includes processing circuitry. The processing circuitry can be configured to perform any of the methods for media processing.

Aspects of the disclosure also provide a non-transitory computer-readable medium storing instructions which when executed by a computer for video decoding cause the computer to perform any of the methods for media processing.

BRIEF DESCRIPTION OF THE DRAWINGS

Further features, the nature, and various advantages of the disclosed subject matter will be more apparent from the following detailed description and the accompanying drawings in which.

DETAILED DISCRETION OF EMBODIMENTS

Figure 1:
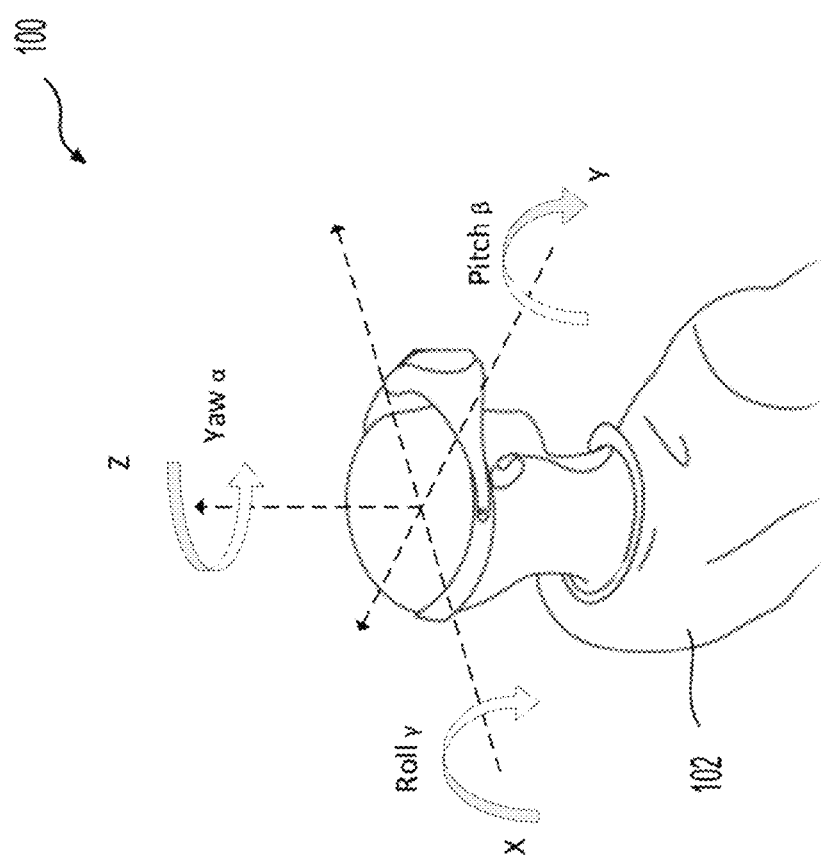
FIG. 1 shows a diagram illustrating an environment using 6 degrees of freedom (6 DoF) in some examples.

The MPEG-I suite of immersive media standards, including "Immersive Audio," "Immersive Video," and "Systems Support," can support a virtual reality (VR) or an augmented reality (AR) presentation (100) in which a user (102) can navigate and interact with the environment using 6 degrees of freedom (6 DoF), which includes a spatial navigation (x, y, z) and a user head orientation (yaw, pitch, roll), as illustrated in FIG. 1 for example.

A goal in MPEG-I presentations is to impart the feeling that a user (e.g., (102)) is actually present in a virtual world. Audio in the world (or scene) can be perceived as in a real world, with sounds coming from an associated visual figure. That is, sounds can be perceived with a correct location and/or a correct distance. A physical movement of the user in the real world can be perceived as having a matching movement in the virtual world. Furthermore, and importantly, the user can interact with the virtual scene and cause sounds that are perceived as realistic to match or otherwise simulate the experience of the user in the real world.

The disclosure is related to immersive media. When rendering immersive media, an acoustic scene and a visual scene may exhibit inconsistence, which can degrade a media experience of a user. In the disclosure, aspects including methods and apparatuses are provided to improve consistence of the acoustic and visual scenes.

In the MPEG-I immersive audio standards, a visual scene can be rendered by a first engine such as the Unity engine, and an acoustic scene can be described by a second engine. The second engine can be an audio engine, such as an MPEG-I immersive audio encoder.

Figure 2:
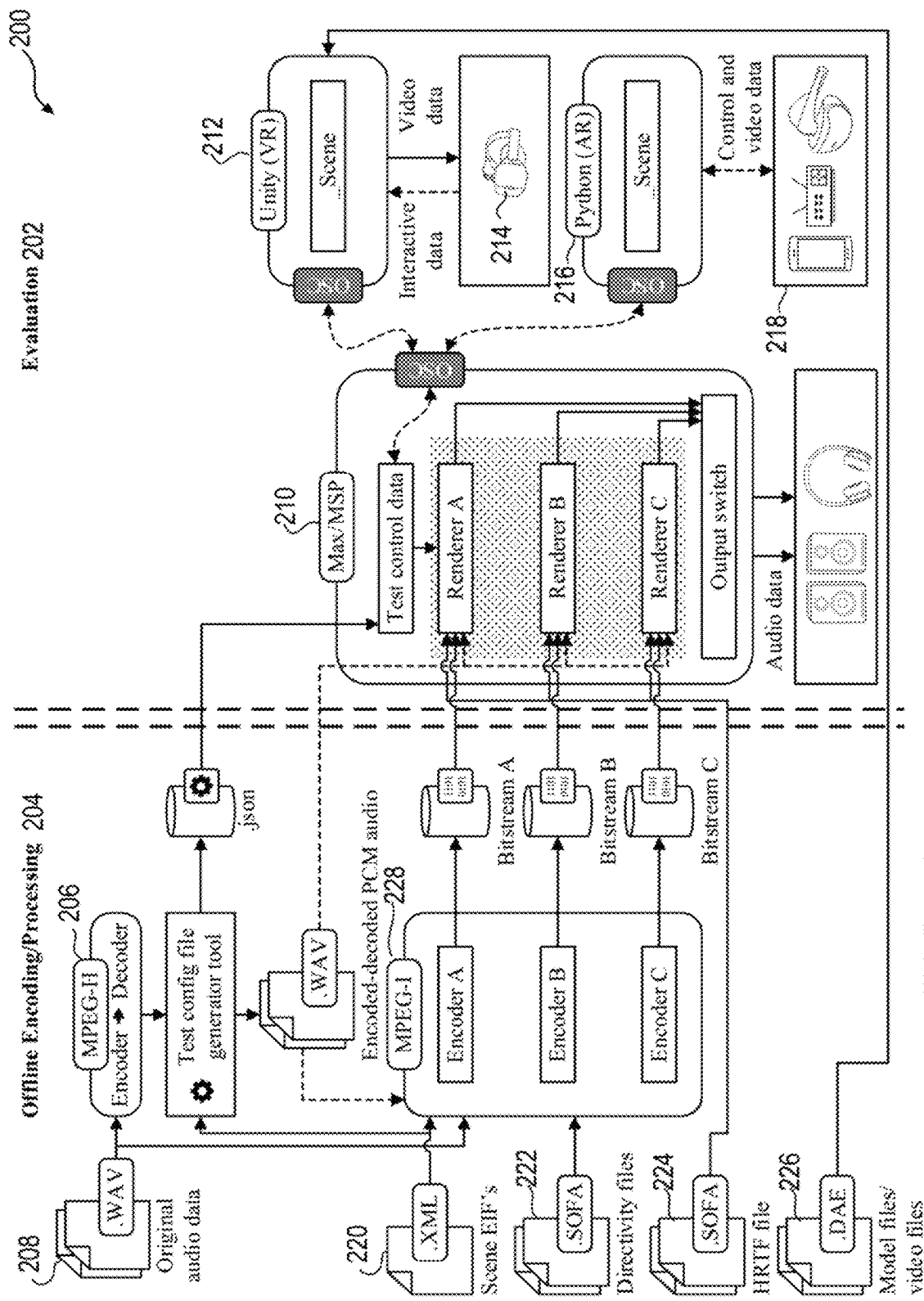
FIG. 2 shows a diagram illustrating a MPEG-I immersive audio evaluation platform and process according to an embodiment of the disclosure.

FIG. 2 is a block diagram of an exemplary MPEG-I immersive audio evaluation platform (AEP) (200). As shown in FIG. 2, the AEP (200) can include an evaluation component (202) and an offline encoding/processing component (204). The evaluation component (202) can include Unity (212) and a Max/MSP (210). Unity is a cross-platform game engine that can be used to create three-dimensional and two-dimensional games, as well as interactive simulations and other experiences. The Max/MSP, also known as Max or Max/MSP/Jitter, is a visual programming language for music and multimedia, for example. Max is a platform that can accommodate and connect a wide variety of tools for sound, graphics, music and interactivity using a flexible patching and programming environment.

Unity (212) can display a video in a head-mounted display (HMD) (214). A head tracker in the HMD, responding to positioning beacons, can connect back to the Unity engine (212), which then can send user position and orientation information to the Max/MSP (210) via a Unity extOSC message. The Max/MSP (210) can support a number of max externals running in parallel. In the AEP (200), each max external can be a candidate immersive audio decoding and rendering engine running in real time. For example, as shown in FIG. 2, the Max/MSP (210) can include renderers A, B, and C that can run in parallel. Still in FIG. 2, the evaluation component (202) can include a compiler (216) that is configured to compile, for example, a Python program and communicate with a control and video data from a controller (218), such as a smartphone and a gamming controller. The compiler (216) can also communicate with the Max/MSP (210) via a Unity extOSC message.

In the offline encoding/processing component (204), MPEG-I immersive audio streams can be processed. A MPEG-H 3D audio (206) can be a codec for all audio signals (e.g., (208)). Hence, the audio signals can be common to all proponent renderers (e.g., renderers A, B, and C). In the AEP (200), audio signals can be "precoded," which can mean that original audio signals can be encoded and then decoded using MEPG-H 3D audio (206), and these signals are then supplied to the Max/MSP (210) in the evaluation component (202) and to the individual max externals (or renderers). Still referring to FIG. 2, in the offline encoding/processing component (204), data in a scene file (220) and data in a directivity file (222) can be processed by a MPEG-I processor (or compressor) (228). The processed data can further be transmitted to the Max/Msp (210). Further, data in a HRTF file (224) can be transmitted to the renderers of the Max/Msp (210), and data in a model file/video file (226) can be transmitted to Unity (212) for processing.

For immersive media rendering, the acoustic scene and the visual scene can be described by different engines. For example, the acoustic scene can be described by a MPEG-I immersive audio encoder input format, while the visual scene can be described from the Unity engine. As the acoustic scene and the visual scene are handled by two different engines or modules, it may happen that the acoustic scene and the visual scene are not consistent.

Figure 3:
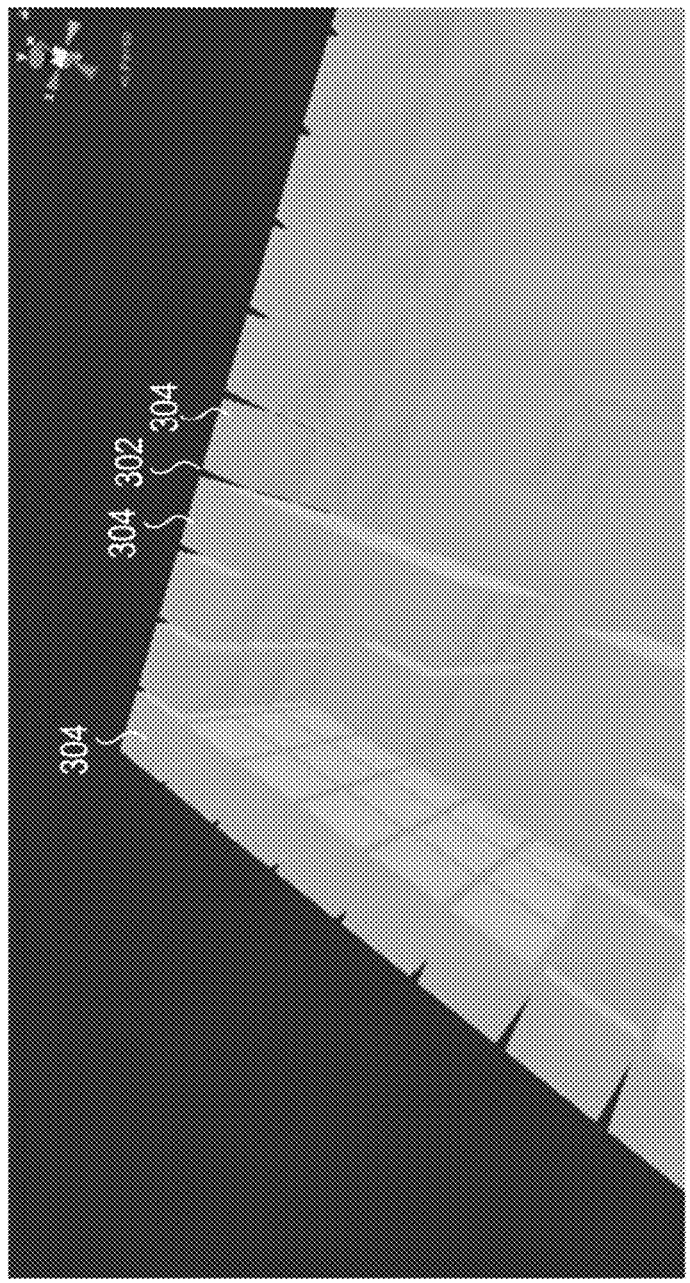
FIG. 3 shows an exemplary acoustic scene of a test scene according to an embodiment of the disclosure.
Figure 4:
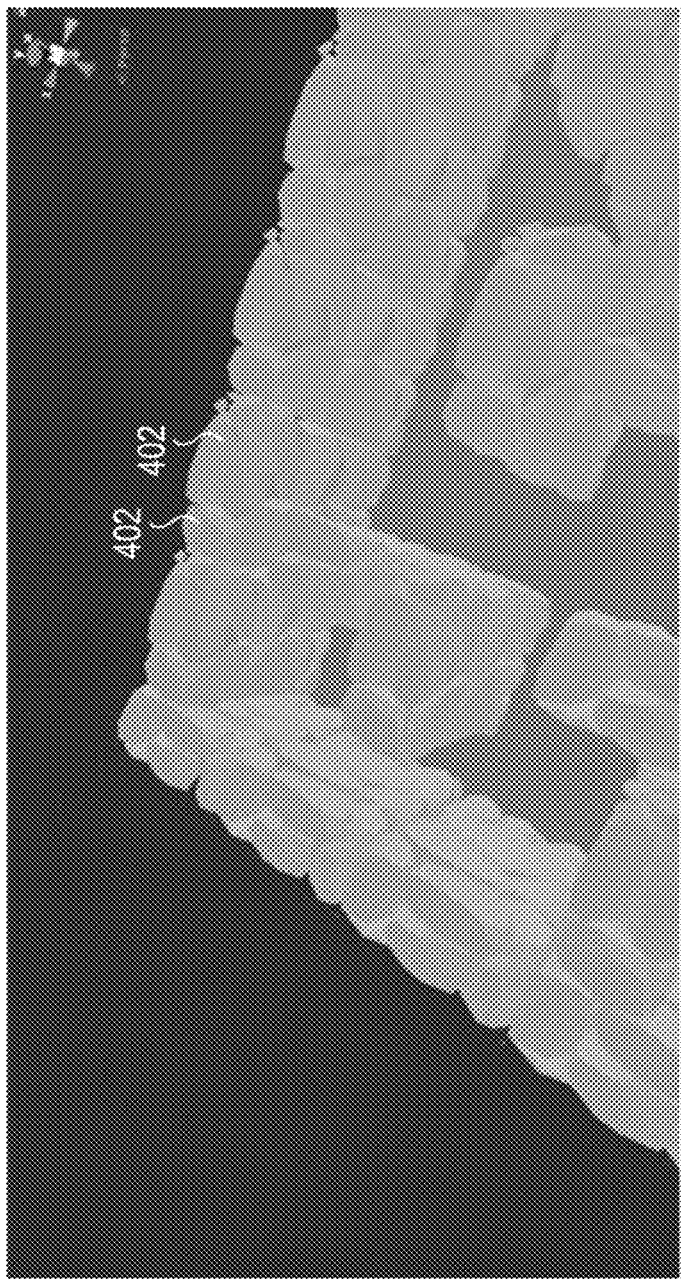
FIG. 4 shows an exemplary visual scene of the test scene from Unity engine according to an embodiment of the disclosure.

An example of inconsistence of acoustic and visual scenes can be shown in FIGS. 3 and 4. FIG. 3 shows an overview of an acoustic scene (300) of a test scene in an MPEG-I immersive audio standard. As can be seen in FIG. 3, gaps (e.g., (302)) can exist between cube-like wall elements (304). Acoustic diffraction effects and occlusion effects can be evaluated by test persons around corners and edges of the wall elements (304).

FIG. 4 shows an overview of a visual scene (400) from the Unity engine for the same test scene of FIG. 3. As can be seen in FIG. 4, walls can be rendered with a stone shape, with almost no gaps in between the wall elements (402). As visible edges in the visual scene (400) rendered by Unity do not correspond to edges of an acoustic geometry in the acoustic scene (300), such discrepancies may degrade a media experience of the test persons (or users). In other words, an audio renderer can acoustically render the diffraction caused by the cube-like wall elements in the acoustic scene (300) whereas the wall could show a very different visual geometry in the visual scene (400). As the wall geometry in the visual scene and the wall geometry in the acoustic scene are inconsistent, the test persons can be confused as rendered audio behaves inconsistently with the visual expectation from the visual rendering.

The inconsistence between the rendered audio experience and the visual experience can be caused by the inconsistence between the acoustic scene description and the visual scene description. In the disclosure, methods are provided to improve the consistency of the acoustic and visual scene descriptions.

One or more parameters of an object (e.g., wall element (304)) indicated by one of a description of the object in the acoustic scene and the description of the object in the visual scene can be modified according to the one or more parameters of the object indicated by the other one of the description of the object in the acoustic scene and the description of the object in the visual scene. The parameter of the object can be at least one of an object size, an object shape, an object location, an object orientation, an object texture (or object material) of the object, or the like.

In some embodiments, an acoustic scene description (or a description of an acoustic scene) can be revised (or modified) to be consistent with a visual scene description (or a description of a visual scene), and an audio rendering can be provided based on the revised (or modified) acoustic scene description.

For example, the acoustic scene description can be checked against the visual scene description, and the acoustic scene description can be revised to be consistent with the visual scene description if one or more discrepancies or in some cases any discrepancy is determined between the visual scene description and the acoustic scene description. The discrepancy can be determined based on one or more different parameters of an object and one or more thresholds, for example.

When an object size of an object in the acoustic scene description is different from an object size of the object in the visual scene description, the object size of the object in the acoustic scene description can be changed (or modified) based on the object size of the object in the visual scene description. For example, the object size of the object in the acoustic scene description can be changed to be the same as (or equal to) the object size of the object in the visual scene description. Accordingly, the object size of the object in the acoustic scene description can be consistent or more consistent with the object size of the object in the visual scene description.

When an object shape of an object in the acoustic scene description is different from an object shape of the object in the visual scene description, the object shape of the object in the acoustic scene description can be changed based on the object shape of the object in the visual scene description. For example, the object shape of the object in the acoustic scene description can be changed to be the same as the object shape of the object in the visual scene description.

When an object location of an object in the acoustic scene description is different from an object location of the object in the visual scene description, the object location of the object in the acoustic scene description can be changed based on the object location of the object in the visual scene description. For example, the object location of the object in the acoustic scene description can be changed to be the same as the object location of the object in the visual scene description.

When an object orientation of an object in the acoustic scene description is different from an object orientation of the object in the visual scene description, the object orientation of the object in the acoustic scene description can be changed based on the object orientation of the object in the visual scene description. For example, the object orientation of the object in the acoustic scene description can be changed to the same as the object orientation of the object in the visual scene description.

When an object material of an object in the acoustic scene description is different from an object material of the object in the visual scene description, the object material of the object in the acoustic scene description can be changed based on the object material of the object in the visual scene description. For example, the object material of the object in the acoustic scene description can be changed to be the same as the object material of the object in the visual scene description.

In some embodiments, a visual scene description can be revised to be consistent with an acoustic scene description, and a visual rendering can be provided based on the revised visual scene description, if one or more discrepancies or in some cases any discrepancy is determined between the visual scene description and the acoustic scene description.

For example, the visual scene description can be checked against the acoustic scene description, and the visual scene description can be revised to be consistent or more consistent with the acoustic scene description.

When an object size of an object in the visual scene description is different from an object size of the object the acoustic scene description, the object size of the object in the visual scene description can be changed based on the object size of the object in the acoustic scene description. For example, the object size of the object in the acoustic scene description can be changed to be the same as the object size of the object in the acoustic scene description.

When an object shape of an object in the visual scene description is different from an object shape of the object in the acoustic scene description, the object shape of the object in the visual scene description can be changed based on the object shape of the object in the acoustic scene description. For example, the object shape of the object in the acoustic scene description can be changed to be the same as the object shape of the object in the acoustic scene description.

When an object location of an object in the visual scene description is different from an object location of the object in the acoustic scene description, the object location of the object in the visual scene description can be changed based on the object location of the object in the acoustic scene description. For example, the object location of the object in the acoustic scene description can be changed to be the same as the object location of the object in the acoustic scene description.

When an object orientation of an object in the visual scene description is different from an object orientation of the object in the acoustic scene description, the object orientation of the object in the visual scene description can be changed based on the object orientation of the object in the acoustic scene description. For example, the object orientation of the object in the acoustic scene description can be changed to be the same as the object orientation of the object in the acoustic scene description.

When an object material of an object in the visual scene description is different from an object material of the object in the acoustic scene description, the object material of the object in the visual scene description can be changed based on the object material of the object in the acoustic scene description. For example, the object material of the object in the acoustic scene description can be changed to be the same as the object material of the object in the acoustic scene description.

In some embodiments, an acoustic scene description and a visual scene description can be merged or otherwise combined to generate a unified scene description. When the acoustic scene description is different from the unified scene description, the acoustic scene description can be revised based on the unified scene description or to be consistent with the unified scene description, and an audio rendering can apply the revised acoustic scene description. When the visual scene description is different from the unified scene description, the visual scene description can be revised based on the unified scene description or to be consistent with the unified scene description, and the visual rendering can apply the revised visual scene description.

In an embodiment, when an object size of an object in the acoustic scene description is different from an object size of the object in the visual scene description, an object size of the object in the unified scene description can be one of, or otherwise based on, (1) the object size of the object in the acoustic scene description, (2) the object size of the object in the visual scene description, (3) a size of an intersection of the object in the acoustic scene description and the object in the visual scene description, or (4) a size based on a difference between the object size in the acoustic scene description and the object size in the visual scene description. Different weights can be applied to the sizes of the object in the acoustic scene description and the visual scene description in some examples.

In an embodiment, when an object shape of an object in the acoustic scene description is different from the object shape of the object in the visual scene description, the object shape in the unified scene description can be one of, or otherwise based on, (1) the object shape in the acoustic scene description, (2) the object shape in the visual scene description, (3) a shape of an intersection of the object in the acoustic scene description and the object in the visual scene description, or (4) a shape based on a difference between the object shape in the acoustic scene description and the object shape in the visual scene description. Different weights can be applied to the shapes of the object in the acoustic scene description and the visual scene description in some examples.

In an embodiment, when an object location of an object in the acoustic scene description is different from an object location of the object in the visual scene description, an object location of the object in the unified scene description can be one of, or otherwise based on, (1) the object location in the acoustic scene description, (2) the object location in the visual scene description, or (3) a location based on a different between the object location in the acoustic scene description and the object location in the visual scene description. Different weights can be applied to the locations of the object in the acoustic scene description and the visual scene description in some examples.

In an embodiment, when an object orientation of the object in the acoustic scene description is different from an object orientation of the object in the visual scene description, the object orientation in the unified scene description can be one of, or otherwise based on, (1) the object orientation in the acoustic scene description, (2) the object orientation in the visual scene description, or (3) an orientation based on a difference between the object orientation in the acoustic scene description and the object orientation in the visual scene description. Different weights can be applied to the object orientations of the object in the acoustic scene description and the visual scene description in some examples.

In an embodiment, when an object material (e.g., object texture, object composition, or object substance) of an object in the acoustic scene description is different from an object material of the object in the visual scene description, the object material in the unified scene description can be one of, or otherwise based on, (1) the object material in the acoustic scene description, (2) the object material in the visual scene description, or (3) a material based on a difference between the object material in the acoustic scene description and the object material in the visual scene description. Different weights can be applied to the materials of the object in the acoustic scene description and the visual scene description in some examples.

In some embodiments, an anchor scene description can be determined (or selected) based on one of a visual scene description and an acoustic scene description. For example, the anchor scene can include anchors, which are objects that an AR software can recognize and apply for integrating the real and virtual worlds. The acoustic scene description can be revised to be consistent with the visual scene description, or the visual scene description can be revised to be consistent with the acoustic scene description. A visual rendering or an audio rendering can further be based on the selected (or determined) anchor scene description.

In an embodiment, an indication can be sent to a receiver (or a client end) as a part of the bitstream associated with the visual data or audio data. The indication can indicate whether the anchor scene description is based on the visual scene description or the acoustic scene description. In another embodiment, such an indication can be sent as part of system level metadata.

In some embodiments, selection information such as a selection message can be signaled to a receiver (or a client end). The selection message can indicate how the unified scene description is generated. For example, the selection message can indicate whether a unified scene description is determined from either a visual scene and/or an audio scene (or acoustic scene). Thus, according to the selection message, the unified scene can be determined, for example as one of the visual scene or audio scene. In other words, either the visual scene or the audio scene can be selected as the unified scene in some examples. A visual rendering or an audio rendering can be based on the selected unified scene description. The signaling information (e.g., the selection message) can be sent as a part of a bitstream or as system level metadata for example.

In an embodiment, an object size of an object in the unified scene description can be signaled to be from either the visual scene or the audio scene. Thus, according to the signaling information, the object size of the object in the unified scene description can be determined as or based on one of an object size of the object in the visual scene description or an object size of the object in the acoustic scene description.

In an embodiment, an object shape of an object in the scene description can be signaled to be from either the visual scene or the audio scene. Thus, according to the signaling information, the object shape of the object in the unified scene description can be determined as or based on one of an object shape of the object in the visual scene description or an object shape of the object in the acoustic scene description.

In an embodiment, an object orientation of an object in the scene description can be signaled to be from either the visual scene or the audio scene. Thus, according to the signaling information, the object orientation of the object in the unified scene description can be determined as or based on one of an object orientation of the object in the visual scene description or an object orientation of the object in the acoustic scene description.

In an embodiment, an object location of an object in the scene description can be signaled to be from either the visual scene or the audio scene. Thus, according to the signaling information, the location of the object in the unified scene description can be determined as or based on one of a location of the object in the visual scene description or a location of the object in the acoustic scene description.

In an embodiment, an object material of an object in the scene description can be signaled to be from either the visual scene or the audio scene. Thus, according to the signaling information, the object material of the object in the unified scene description can be determined as or based on one of an object material of the object in the visual scene description or an object material of the object in the acoustic scene description.

Figure 5:
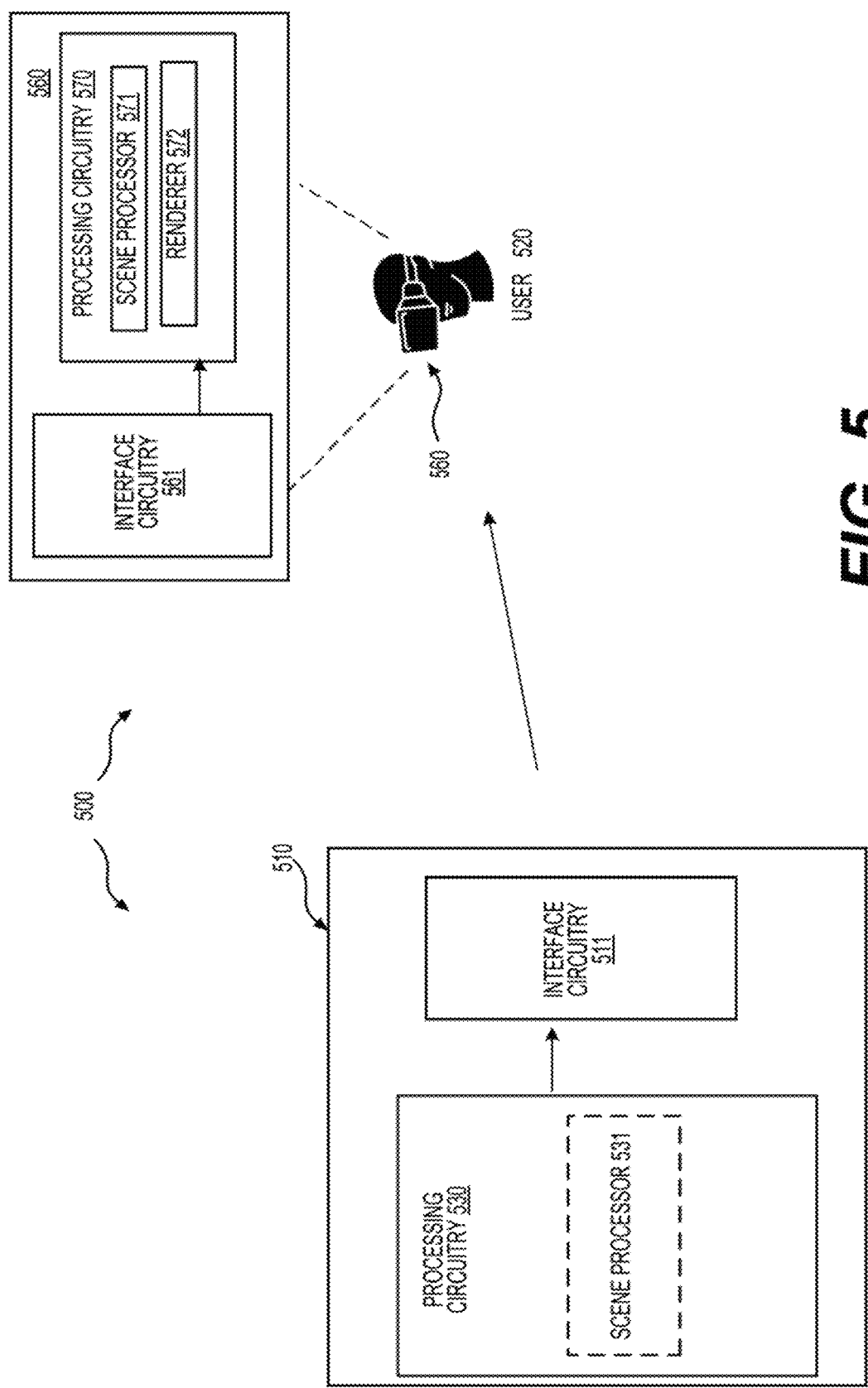
FIG. 5 shows a block diagram of a media system according to an embodiment of the disclosure.

FIG. 5 shows a block diagram of a media system (500) according to an embodiment of the disclosure. The media system (500) can be used in various use applications, such as immersive media application, augmented reality (AR) application, virtual reality application, video game application, sports game animation application, a teleconference and telepresence application, a media streaming application, and the like.

The media system (500) includes a media server device (510) and a plurality of media client devices, such as a media client device (560) shown in FIG. 5, that can be connected by a network (not shown). In an example, the media server device (510) can include one or more devices with audio coding and video coding functionalities. In an example, the media server device (510) includes a single computing device, such as a desktop computer, a laptop computer, a server computer, a tablet computer and the like. In another example, the media server device (510) includes data center(s), server farm(s), and the like. The media server device (510) can receive media content data. The media content data can include video and audio content. The media content data can include a description of an object in an acoustic scene that is generated by an audio engine and a description of the object in a visual scene that is generated by a visual engine. The media server device (510) can compress the video content and audio content into one or more encoded bitstreams in accordance to suitable media coding standards. The encoded bitstreams can be delivered to the media client device (560) via the network.

The media client device (560) can include one or more devices with video coding and audio coding functionality for media applications. In an example, the media client device (560) can include a computing device, such as a desktop computer, a laptop computer, a server computer, a tablet computer, a wearable computing device, a HMD device, and the like. The media client device (560) can decode the encoded bitstream in accordance to suitable media coding standards. The decoded video contents and audio contents can be used for media play.

The media server device (510) can be implemented using any suitable technology. In the FIG. 5 example, the media server device (510) includes a processing circuitry (530) and an interface circuitry (511) coupled together.

The processing circuitry (530) can include any suitable processing circuitry, such as one or more central processing units (CPUs), one or more graphics processing units (GPUs), application specific integrated circuit, and the like. The processing circuitry (530) can be configured to include various encoders, such as an audio encoder, a video encoder, and the like. In an example, one or more CPUs and/or GPUs can execute software to function as the audio encoder or video encoder. In another example, the audio encoder or video encoder can be implemented using application specific integrated circuits.

In some examples, the processing circuitry (530) includes a scene processor (531). The scene processor (531) can determine whether one or more parameters of an object indicated by the description of the object in the acoustic scene and the one or more parameters of the object indicated by the description of the object in the visual scene are different. In response to the parameter of the object indicated by the description of the object in the acoustic scene and the parameter of the object indicated by the description of the object in the visual scene being different, the scene processor (531) can modify at least one of the description of object in the acoustic scene or the description of the object in the visual scene such that the parameter of the object indicated by the description of the object in the acoustic scene is consistent or more consistent with the parameter of the object indicated by the description of the object in the visual scene.

The interface circuitry (511) can interface the media server device (510) with the network. The interface circuitry (511) can include a receiving portion that receives signals from the network and a transmitting portion that transmits signals to the network. For example, the interface circuitry (511) can transmit signals that carry the encoded bitstreams to other devices, such as the media client device (560) and the like via the network. The interface circuitry (511) can receive signals from the media client devices, such as the media client device (560).

The network is suitably coupled with the media server device (510) and the media client device (560) via wired and/or wireless connections, such as Ethernet connections, fiber-optic connections, WiFi connections, cellular network connections and the like. The network can include network server devices, storage devices, network devices and the like. The components of the network are suitably coupled together via wired and/or wireless connections.

The media client device (560) can be configured to decode the coded bitstreams. In an example, the media client device (560) can perform video decoding to reconstruct a sequence of video frames that can be displayed and can perform audio decoding to generate audio signals for playing.

The media client device (560) can be implemented using any suitable technology. In the FIG. 5 example, the media client device (560) is shown, but not limited to a HMD with earphones as user equipment that can be used by a user (520).

In FIG. 5, the media client device (560) can include an interface circuitry (561) and a processing circuitry (570) coupled together as shown in FIG. 5.

The interface circuitry (561) can interface the media client device (560) with the network. The interface circuitry (561) can include a receiving portion that receives signals from the network and a transmitting portion that transmits signals to the network. For example, the interface circuitry (561) can receive signals carrying data, such as signals carrying the encoded bitstream from the network.

The processing circuitry (570) can include suitable processing circuitry, such as CPU, GPU, application specific integrated circuits and the like. The processing circuitry (570) can be configured to include various components, such a scene processor (571), a renderer (572), video decoder (not shown), audio decoder (not shown) and the like.

In some examples, the audio decoder can decode audio content in an encoded bitstream by selecting a decoding tool suitable for a scheme by which the audio content was encoded, and the video decoder can decode video content in an encoded bitstream by selecting a decoding tool suitable for a scheme by which the video content was encoded. The scene processor (571) is configured to modify one of a description of a visual scene and a description of an acoustic scene in the decoded media content. Therefore, one or more parameters of an object indicated by the description of the object in the acoustic scene is consistent with the one or more parameters of the object indicated by the description of the object in the visual scene.

Further, the renderer (572) can generate a final digital product suitable for the media client device (560) from audio content and video content decoded from the encoded bitstreams. It is noted that the processing circuitry (570) can include other suitable components (not shown), such as mixer, post processing circuit, and the like for further media processing.

Figure 6:
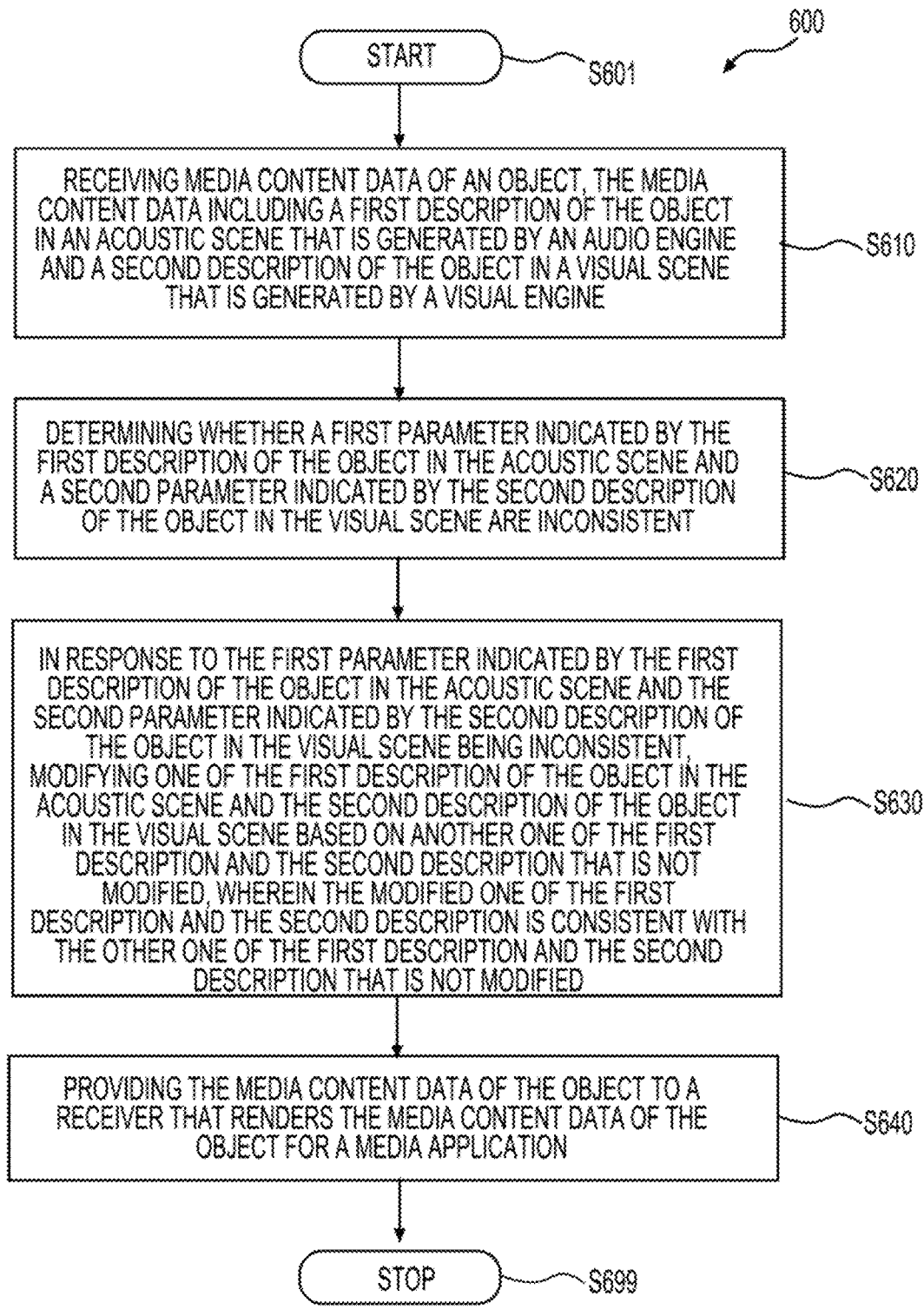
FIG. 6 shows a flow chart outlining a process according to some embodiments of the disclosure.

FIG. 6 shows a flow chart outlining a process (600) according to an embodiment of the disclosure. The process (600) can be performed by a media processing device, such as the scene processor (531) in the media server device (510), the scene processor (571) in the media client device (560), and the like. In some embodiments, the process (600) is implemented in software instructions, thus when the processing circuitry executes the software instructions, the processing circuitry performs the process (600). The process starts at (S601) and proceeds to (S610).

At (S610), media content data of an object can be received. The media content data can include a first description of the object in an acoustic scene that is generated by an audio engine and a second description of the object in a visual scene that is generated by a visual engine.

At (S620), whether a first parameter indicated by the first description of the object in the acoustic scene and a second parameter indicated by the second description of the object in the visual scene are inconsistent can be determined.

At (S630), in response to the first parameter indicated by the first description of the object in the acoustic scene and the second parameter indicated by the second description of the object in the visual scene being inconsistent, one of the first description of the object in the acoustic scene and the second description of the object in the visual scene can be modified based on another one of the first description and the second description that is not modified. The modified one of the first description and the second description can be consistent with the other one of the first description and the second description that is not modified.

At (S640), the media content data of the object can be provided to a receiver that renders the media content data of the object for a media application.

In some embodiments, the first parameter and the second parameter can be both associated with one of an object size, an object shape, an object location, an object orientation, and an object texture of the object.

The one of the first description of the object in the acoustic scene and the second description of the object in the visual scene can be modified based on the other one of the first description of the object in the acoustic scene and the second description of the object in the visual scene. Accordingly, the first parameter indicated by the first description of the object in the acoustic scene can be consistent with the second parameter indicated by the second description of the object in the visual scene.

In the process (600), a third description of the object in a unified scene can be determined based on at least one of the first description of the object in the acoustic scene or the second description of the object in the visual scene. In response to the first parameter indicated by the first description of the object in the acoustic scene being different from a third parameter indicated by the third description of the object in the unified scene, the first parameter indicated by the first description of the object in the acoustic scene can be modified based on the third parameter indicated by the third description of the object in the unified scene. In response to the second parameter indicated by the second description of the object in the visual scene being different from the third parameter indicated by the third description of the object in the unified scene, the second parameter indicated by the second description of the object in the visual scene can be modified based on the third parameter indicated by the third description of the object in the unified scene.

In an example, an object size in the third description of the object in the unified scene can be determined based on an object size in the first description of the object in the acoustic scene. The object size in the third description of the object in the unified scene can be determined based on an object size in the second description of the object in the visual scene. The object size in the third description of the object in the unified scene can be determined based on an intersection size of an intersection between the object in the first description of the object in the acoustic scene and the object in the second description of the object in the visual scene. The object size in the third description of the object in the unified scene can be determined based on a size difference between the object size in the first description of the object in the acoustic scene and the object size in the second description of the object in the visual scene.

In an example, an object shape in the third description of the object in the unified scene can be determined based on an object shape in the first description of the object in the acoustic scene. The object shape in the third description of the object in the unified scene can be determined based on an object shape in the second description of the object in the visual scene. The object shape in the third description of the object in the unified scene can be determined based on an intersection shape of an intersection between the object in the first description of the object in the acoustic scene and the object in the second description of the object in the visual scene. The object shape in the third description of the object in the unified scene can be determined based on a shape difference between the object shape in the first description of the object in the acoustic scene and the object shape in the second description of the object in the visual scene.

In an example, an object location in the third description of the object in the unified scene can be determined based on an object location in the first description of the object in the acoustic scene. The object location in the third description of the object in the unified scene can be determined based on an object location in the second description of the object in the visual scene. The object location in the third description of the object in the unified scene can be determined based on a location difference between the object location in the first description of the object in the acoustic scene and the object location in the second description of the object in the visual scene.

In an example, an object orientation in the third description of the object in the unified scene can be determined based on an object orientation in the first description of the object in the acoustic scene. The object orientation in the third description of the object in the unified scene can be determined based on an object orientation in the second description of the object in the visual scene. The object orientation in the third description of the object in the unified scene can be determined based on an orientation difference between the object orientation in the first description of the object in the acoustic scene and the object orientation in the second description of the object in the visual scene.

In an example, an object texture in the third description of the object in the unified scene can be determined based on an object texture in the first description of the object in the acoustic scene. The object texture in the third description of the object in the unified scene can be determined based on an object texture in the second description of the object in the visual scene. The object texture in the third description of the object in the unified scene can be determined based on a texture difference between the object texture in the first description of the object in the acoustic scene and the object texture in the second description of the object in the visual scene.

In some embodiments, a description of the object in an anchor scene of the media content data can be determined based on one of the first description of the object in the acoustic scene and the second description of the object in the visual scene. In response to the description of the object in the anchor scene being determined based on the first description of the object in the acoustic scene, the second description of the object in the visual scene can be modified based on the first description of the object in the acoustic scene. In response to the description of the object in the anchor scene being determined based on the second description of the object in the visual scene, the first description of the object in the acoustic scene can be modified based on the second description of the object in the visual scene. Further, signaling information can be generated to indicate which one of the first description of the object in the acoustic scene and the second description of the object in the visual scene is selected to determine the description of the anchor scene.

In some embodiment, signaling information can be generated to indicate which one of the first parameter in the first description of the object in the acoustic scene and the second parameter in the second description of the object in the visual scene is selected to determine the third parameter in the third description of the object in the unified scene.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
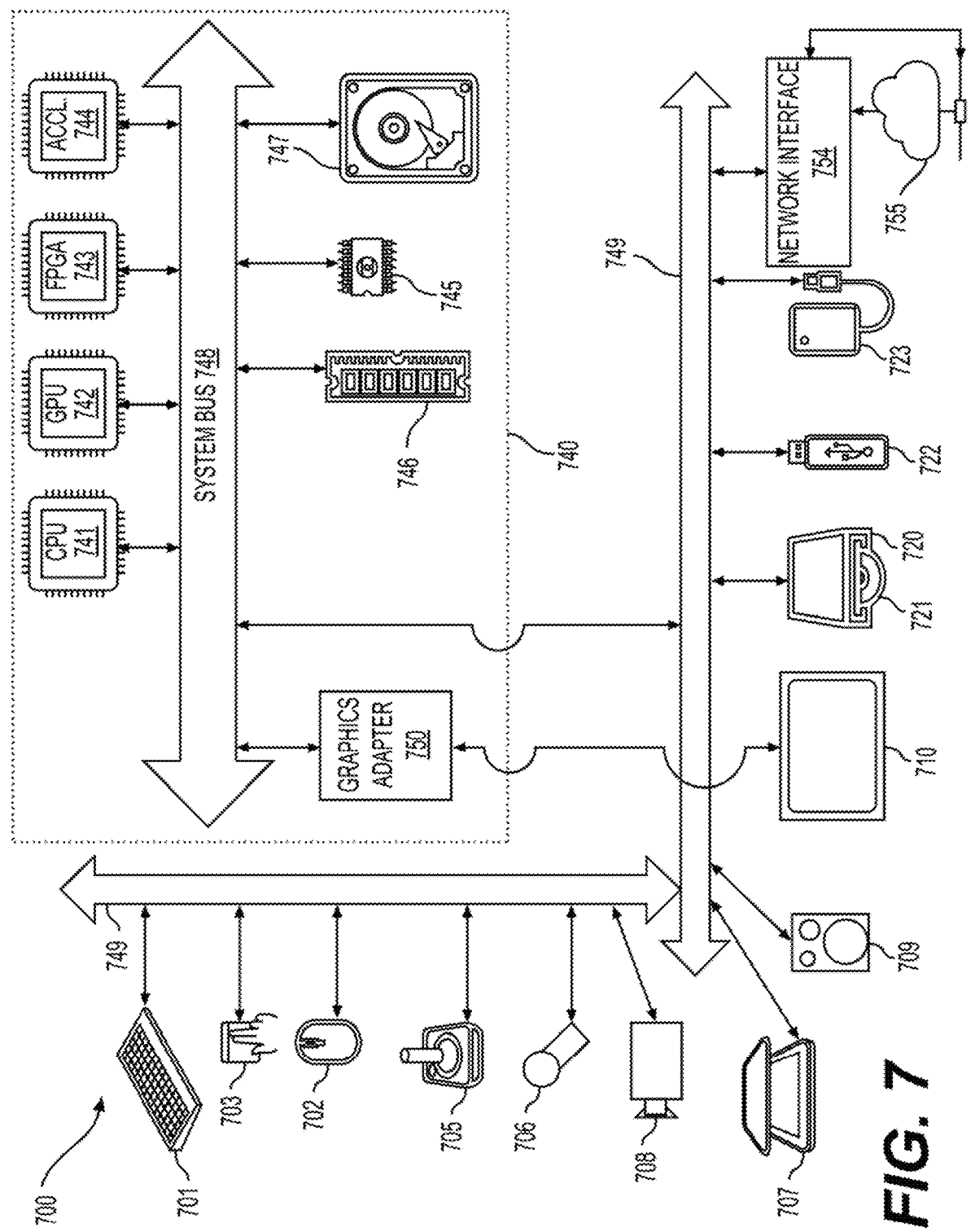
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media processing at a media processing device, comprising:
   receiving media content data of an object, the media content data including a first description of the object in an acoustic scene of a virtual environment that is generated by an audio engine and a second description of the object in a visual scene of the virtual environment that is generated by a visual engine;
   determining whether a first parameter of an object characteristic indicated by the first description of the object in the acoustic scene and a second parameter of the object characteristic indicated by the second description of the object in the visual scene are different;
   when the first parameter indicated by the first description of the object in the acoustic scene and the second parameter indicated by the second description of the object in the visual scene are different, modifying one of the first parameter indicated by the first description of the object in the acoustic scene and the second parameter indicated by the second description of the object in the visual scene based on another one of the first parameter indicated by the first description and the second parameter indicated by the second description that is not modified, wherein the modified one of the first parameter indicated by the first description and the second parameter indicated by the second description is the same as the other one of the first parameter indicated by the first description and the second parameter indicated by the second description that is not modified; and
   providing the media content data of the object to a receiver that renders the media content data of the object for a media application,
   wherein the receiver renders audio based on the first parameter of the object characteristic and renders content for display based on the second parameter of the object characteristic after the one of the first description of the object in the acoustic scene and the second description of the object in the visual scene is modified based on the other one of the first description and the second description that is not modified.

2. The method of claim 1, wherein the object characteristic is one of an object size, an object shape, an object location, an object orientation, and an object texture of the object.

3. The method of claim 1, wherein the modifying comprises:
   modifying the one of the first description of the object in the acoustic scene and the second description of the object in the visual scene based on the other one of the first description of the object in the acoustic scene and the second description of the object in the visual scene such that the first parameter indicated by the first description of the object in the acoustic scene is the same as the second parameter indicated by the second description of the object in the visual scene.

4. The method of claim 2, further comprising:
   determining a third description of the object in a unified scene of the virtual environment based on at least one of the first description of the object in the acoustic scene or the second description of the object in the visual scene;
   when the first parameter indicated by the first description of the object in the acoustic scene is different from a third parameter indicated by the third description of the object in the unified scene, modifying the first parameter indicated by the first description of the object in the acoustic scene based on the third parameter indicated by the third description of the object in the unified scene; and
   when the second parameter indicated by the second description of the object in the visual scene is different from the third parameter indicated by the third description of the object in the unified scene, modifying the second parameter indicated by the second description of the object in the visual scene based on the third parameter indicated by the third description of the object in the unified scene.

5. The method of claim 4, wherein the determining the third description further comprises one of:
   determining an object size in the third description of the object in the unified scene based on an object size in the first description of the object in the acoustic scene;
   determining the object size in the third description of the object in the unified scene based on an object size in the second description of the object in the visual scene;
   determining the object size in the third description of the object in the unified scene based on an intersection size of an intersection between the object in the first description of the object in the acoustic scene and the object in the second description of the object in the visual scene; and
   determining the object size in the third description of the object in the unified scene based on a size difference between the object size in the first description of the object in the acoustic scene and the object size in the second description of the object in the visual scene.

6. The method of claim 4, wherein the determining the third description further comprises one of:
   determining an object shape in the third description of the object in the unified scene based on an object shape in the first description of the object in the acoustic scene;
   determining the object shape in the third description of the object in the unified scene based on an object shape in the second description of the object in the visual scene;
   determining the object shape in the third description of the object in the unified scene based on an intersection shape of an intersection between the object in the first description of the object in the acoustic scene and the object in the second description of the object in the visual scene; and determining the object shape in the third description of the object in the unified scene based on a shape difference between the object shape in the first description of the object in the acoustic scene and the object shape in the second description of the object in the visual scene.

7. The method of claim 4, wherein the determining the third description further comprises one of:

determining an object location in the third description of the object in the unified scene based on an object location in the first description of the object in the acoustic scene;

determining the object location in the third description of the object in the unified scene based on an object location in the second description of the object in the visual scene; and determining the object location in the third description of the object in the unified scene based on a location difference between the object location in the first description of the object in the acoustic scene and the object location in the second description of the object in the visual scene.

8. The method of claim 4, wherein the determining the third description further comprises one of:

determining an object orientation in the third description of the object in the unified scene based on an object orientation in the first description of the object in the acoustic scene;

determining the object orientation in the third description of the object in the unified scene based on an object orientation in the second description of the object in the visual scene; and determining the object orientation in the third description of the object in the unified scene based on an orientation difference between the object orientation in the first description of the object in the acoustic scene and the object orientation in the second description of the object in the visual scene.

9. The method of claim 4, wherein the determining the third description further comprises one of:

determining an object texture in the third description of the object in the unified scene based on an object texture in the first description of the object in the acoustic scene;

determining the object texture in the third description of the object in the unified scene based on an object texture in the second description of the object in the visual scene; and determining the object texture in the third description of the object in the unified scene based on a texture difference between the object texture in the first description of the object in the acoustic scene and the object texture in the second description of the object in the visual scene.

10. The method of claim 1, further comprising:

determining a description of the object in an anchor scene of the virtual environment of the media content data based on one of the first description of the object in the acoustic scene and the second description of the object in the visual scene;

when the description of the object in the anchor scene is determined based on the first description of the object in the acoustic scene, modifying the second description of the object in the visual scene based on the first description of the object in the acoustic scene;

when the description of the object in the anchor scene is determined based on the second description of the object in the visual scene, modifying the first description of the object in the acoustic scene based on the second description of the object in the visual scene; and generating signaling information that indicates which one of the first description of the object in the acoustic scene and the second description of the object in the visual scene is selected to determine the description of the anchor scene.

11. The method of claim 4, further comprising:

generating signaling information that indicates which one of the first parameter in the first description of the object in the acoustic scene and the second parameter in the second description of the object in the visual scene is selected to determine the third parameter in the third description of the object in the unified scene.

12. An apparatus for media processing, comprising:

processing circuitry configured to:

receive media content data of an object, the media content data including a first description of the object in an acoustic scene of a virtual environment that is generated by an audio engine and a second description of the object in a visual scene of the virtual environment that is generated by a visual engine;

determine whether a first parameter of an object characteristic indicated by the first description of the object in the acoustic scene and a second parameter of the object characteristic indicated by the second description of the object in the visual scene are different;

when the first parameter indicated by the first description of the object in the acoustic scene and the second parameter indicated by the second description of the object in the visual scene are different, modify one of the first parameter indicated by the first description of the object in the acoustic scene and the second parameter indicated by the second description of the object in the visual scene based on another one of the first parameter indicated by the first description and the second parameter indicated by the second description that is not modified, wherein the modified one of the first parameter indicated by the first description and the second parameter indicated by the second description is the same as the other one of the first parameter indicated by the first description and the second parameter indicated by the second description that is not modified; and provide the media content data of the object to a receiver that renders the media content data of the object for a media application, wherein the receiver renders audio based on the first parameter of the object characteristic and renders content for display based on the second parameter of the object characteristic after the one of the first description of the object in the acoustic scene and the second description of the object in the visual scene is modified based on the other one of the first description and the second description that is not modified.

13. The apparatus of claim 12, wherein the object characteristic is one of an object size, an object shape, an object location, an object orientation, and an object texture of the object.

14. The apparatus of claim 12, wherein the processing circuitry is configured to:

modify the one of the first description of the object in the acoustic scene and the second description of the object in the visual scene based on the other one of the first description of the object in the acoustic scene and the second description of the object in the visual scene such that the first parameter indicated by the first description of the object in the acoustic scene is the same as the second parameter indicated by the second description of the object in the visual scene.

15. The apparatus of claim 13, wherein the processing circuitry is configured to:
determine a third description of the object in a unified scene of the virtual environment based on at least one of the first description of the object in the acoustic scene or the second description of the object in the visual scene;
when the first parameter indicated by the first description of the object in the acoustic scene is different from a third parameter indicated by the third description of the object in the unified scene, modify the first parameter indicated by the first description of the object in the acoustic scene based on the third parameter indicated by the third description of the object in the unified scene; and
when the second parameter indicated by the second description of the object in the visual scene is different from the third parameter indicated by the third description of the object in the unified scene, modify the second parameter indicated by the second description of the object in the visual scene based on the third parameter indicated by the third description of the object in the unified scene.

16. The apparatus of claim 15, wherein the processing circuitry is configured to perform one of:
determining an object size in the third description of the object in the unified scene based on an object size in the first description of the object in the acoustic scene;
determining the object size in the third description of the object in the unified scene based on an object size in the second description of the object in the visual scene;
determining the object size in the third description of the object in the unified scene based on an intersection size of an intersection between the object in the first description of the object in the acoustic scene and the object in the second description of the object in the visual scene; and
determining the object size in the third description of the object in the unified scene based on a size difference between the object size in the first description of the object in the acoustic scene and the object size in the second description of the object in the visual scene.

17. The apparatus of claim 15, wherein the processing circuitry is configured to perform one of:
determining an object shape in the third description of the object in the unified scene based on an object shape in the first description of the object in the acoustic scene;
determining the object shape in the third description of the object in the unified scene based on an object shape in the second description of the object in the visual scene;
determining the object shape in the third description of the object in the unified scene based on an intersection shape of an intersection between the object in the first description of the object in the acoustic scene and the object in the second description of the object in the visual scene; and
determining the object shape in the third description of the object in the unified scene based on a shape difference between the object shape in the first description of the object in the acoustic scene and the object shape in the second description of the object in the visual scene.

18. The apparatus of claim 15, wherein the processing circuitry is configured to perform one of:
determining an object location in the third description of the object in the unified scene based on an object location in the first description of the object in the acoustic scene;
determining the object location in the third description of the object in the unified scene based on an object location in the second description of the object in the visual scene; and
determining the object location in the third description of the object in the unified scene based on a location difference between the object location in the first description of the object in the acoustic scene and the object location in the second description of the object in the visual scene.

19. The apparatus of claim 15, wherein the processing circuitry is configured to perform one of:
determining an object orientation in the third description of the object in the unified scene based on an object orientation in the first description of the object in the acoustic scene;
determining the object orientation in the third description of the object in the unified scene based on an object orientation in the second description of the object in the visual scene; and
determining the object orientation in the third description of the object in the unified scene based on an orientation difference between the object orientation in the first description of the object in the acoustic scene and the object orientation in the second description of the object in the visual scene.

20. The apparatus of claim 15, wherein the processing circuitry is configured to perform one of:
determining an object texture in the third description of the object in the unified scene based on an object texture in the first description of the object in the acoustic scene;
determining the object texture in the third description of the object in the unified scene based on an object texture in the second description of the object in the visual scene; and
determining the object texture in the third description of the object in the unified scene based on a texture difference between the object texture in the first description of the object in the acoustic scene and the object texture in the second description of the object in the visual scene.

* * * * *